(12) United States Patent
Klemen

(10) Patent No.: US 7,311,635 B2
(45) Date of Patent: Dec. 25, 2007

(54) SEVEN SPEED TRANSMISSIONS WITH ALL POSITIVE ROTATION COMPONENTS IN FORWARD SPEEDS

(75) Inventor: Donald Klemen, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 238 days.

(21) Appl. No.: 11/233,823

(22) Filed: Sep. 23, 2005

(65) Prior Publication Data

US 2007/0072733 A1    Mar. 29, 2007

(51) Int. Cl.
F16H 3/44       (2006.01)
F16H 3/62       (2006.01)

(52) U.S. Cl. ...................... 475/286; 475/276
(58) Field of Classification Search ............... 475/269, 475/271, 275, 276, 277, 278, 279, 280, 282, 475/284, 286, 288, 290
See application file for complete search history.

(56) References Cited

U.S. PATENT DOCUMENTS

| | | | |
|---|---|---|---|
| 4,070,927 A | 1/1978 | Polak | 475/286 |
| 4,683,776 A * | 8/1987 | Klemen | 475/286 |
| 4,709,594 A | 12/1987 | Maeda | 475/280 |
| 5,106,352 A | 4/1992 | Lepelletier | 475/280 |
| 5,385,064 A | 1/1995 | Reece | 74/331 |
| 5,497,867 A | 3/1996 | Hirsch et al. | 192/48.91 |
| 5,560,461 A | 10/1996 | Loeffler | 192/53.32 |
| 5,599,251 A | 2/1997 | Beim et al. | 475/275 |
| 5,641,045 A | 6/1997 | Ogawa et al. | 192/53.341 |
| 5,651,435 A | 7/1997 | Perosky et al. | 192/219 |
| 5,975,263 A | 11/1999 | Forsyth | 192/53.32 |
| 6,053,839 A | 4/2000 | Baldwin et al. | 475/281 |
| 6,071,208 A | 6/2000 | Koivunen | 475/275 |
| 6,083,135 A | 7/2000 | Baldwin et al. | 475/276 |
| 6,217,474 B1 | 4/2001 | Ross et al. | 475/269 |
| 6,354,416 B1 | 3/2002 | Eo | 192/53.341 |
| 6,375,592 B1 | 4/2002 | Takahashi et al. | 475/262 |
| 6,422,969 B1 | 7/2002 | Raghavan et al. | 475/276 |
| 6,471,615 B1 | 10/2002 | Naraki et al. | 475/262 |
| 6,558,287 B2 | 5/2003 | Hayabuchi et al. | 475/271 |
| 6,623,397 B1 | 9/2003 | Raghavan et al. | 360/96.5 |
| 7,163,484 B2 * | 1/2007 | Klemen | 475/276 |
| 7,226,381 B2 * | 6/2007 | Klemen | 475/275 |
| 2006/0142112 A1 * | 6/2006 | Kamada et al. | 475/275 |
| 2007/0072731 A1 * | 3/2007 | Klemen | 475/276 |
| 2007/0072732 A1 * | 3/2007 | Klemen | 475/280 |

* cited by examiner

Primary Examiner—Roger Pang

(57) ABSTRACT

Seven speed transmissions are provided that include four planetary gear sets having six torque-transmitting mechanisms with various fixed interconnections to provide seven forward speed ratios and three reverse speed ratios. The powertrain includes an engine and torque converter that is continuously connected to at least one of the planetary gear members and an output member that is continuously connected with another of the planetary gear members. The six torque-transmitting mechanisms are operated in combinations of two. All components rotating during forward speeds rotate in the same direction. Reduced component speeds and improved ratios are achieved.

20 Claims, 5 Drawing Sheets

| | RATIOS | 60 | 62 | 64 | 66 | 67 | 68 | 69 |
|---|---|---|---|---|---|---|---|---|
| REVERSE 2 | -1.679 | | | X | | X | | |
| REVERSE 1 | -2.363 | | X | | | X | | |
| REVERSE LOW | -3.326 | X | | | | X | | |
| 1 | 3.357 | X | | | | | X | |
| 2 | 2.385 | | X | | | | X | |
| 3 | 1.695 | | | X | | | X | |
| 4 | 1.259 | | | | X | | X | |
| 5 | 1.000 | | | X | X | | | |
| 6 | 0.853 | | X | | X | | | |
| 7 | 0.7723 | X | | | X | | | |
| 8 | 0.627 | | | | X | | | X |

(X = ENGAGED CLUTCH)

| RATIO SPREAD | |
|---|---|
| 1/6 | 3.936 |
| 1/7 | 4.347 |
| 1/8 | 5.354 |
| RATIO STEPS | |
| REVERSE LOW /1 | -0.991 |
| 1/2 | 1.41 |
| 2/3 | 1.41 |
| 3/4 | 1.38 |
| 4/5 | 1.27 |
| 5/6 | 1.17 |
| 6/7 | 1.10 |
| 7/8 | 1.23 |

| | RATIOS | 60 | 62 | 64 | 66 | 67 | 68 | 69 |
|---|---|---|---|---|---|---|---|---|
| REVERSE 2 | -1.880 | | | X | | X | | |
| REVERSE 1 | -2.739 | | X | | | X | | |
| REVERSE LOW | -3.990 | X | | | | X | | |
| 1 | 4.084 | X | | | | | X | |
| 2 | 2.803 | | X | | | | X | |
| 3 | 1.924 | | | X | | | X | |
| 4 | 1.321 | | | | X | | X | |
| 5 | 1.000 | | | | X | X | | |
| 6 | 0.857 | | X | | | X | | |
| 7 | 0.7805 | X | | | | X | | |
| 8 | 0.653 | | | | X | | | X |

(X = ENGAGED CLUTCH)

FIG. 3A

| RATIO SPREAD | |
|---|---|
| 1/6 | 4.765 |
| 1/7 | 5.233 |
| 1/8 | 6.254 |
| RATIO STEPS | |
| REVERSE LOW /1 | -0.977 |
| 1/2 | 1.46 |
| 2/3 | 1.46 |
| 3/4 | 1.46 |
| 4/5 | 1.32 |
| 5/6 | 1.17 |
| 6/7 | 1.10 |
| 7/8 | 1.20 |

FIG. 3B

| | RATIOS | 60 | 62 | 64 | 66 | 67 | 68 | 69 |
|---|---|---|---|---|---|---|---|---|
| REVERSE 2 | -1.880 | | | X | | X | | |
| REVERSE 1 | -2.990 | | X | | | X | | |
| REVERSE LOW | -4.899 | X | | | | X | | |
| 1 | 5.015 | X | | | | | X | |
| 2 | 3.060 | | X | | | | X | |
| 3 | 1.924 | | | X | | | X | |
| 4 | 1.321 | | | | X | | X | |
| 5 | 1.000 | | | | X | X | | |
| 6 | 0.835 | | X | | | X | | |
| 7 | 0.7531 | X | | | | X | | |
| 8 | 0.653 | | | | X | | | X |

(X = ENGAGED CLUTCH)

FIG. 4A

| RATIO SPREAD | |
|---|---|
| 1/6 | 6.006 |
| 1/7 | 6.659 |
| 1/8 | 7.680 |
| RATIO STEPS | |
| REVERSE LOW /1 | -0.977 |
| 1/2 | 1.64 |
| 2/3 | 1.59 |
| 3/4 | 1.46 |
| 4/5 | 1.32 |
| 5/6 | 1.20 |
| 6/7 | 1.11 |
| 7/8 | 1.15 |

| | RATIOS | 160 | 162 | 164 | 166 | 167 | 168 | 169 |
|---|---|---|---|---|---|---|---|---|
| REVERSE 2 | -1.880 | | | X | | X | | |
| REVERSE 1 | -3.080 | | X | | | X | | |
| REVERSE LOW | -7.904 | X | | | | X | | |
| 1 | 8.091 | X | | | | | X | |
| 2 | 3.153 | | X | | | | X | |
| 3 | 1.924 | | | X | | | X | |
| 4 | 1.321 | | | | X | | X | |
| 5 | 1.000 | | | X | X | | | |
| 6 | 0.828 | | X | | X | | | |
| 7 | 0.7115 | X | | | X | | | |
| 8 | 0.653 | | | | X | | | X |

(X = ENGAGED CLUTCH)

| RATIO SPREAD | |
|---|---|
| 1/6 | 9.772 |
| 1/7 | 11.372 |
| 1/8 | 12.390 |
| RATIO STEPS | |
| REVERSE LOW /1 | -0.977 |
| 1/2 | 2.57 |
| 2/3 | 1.64 |
| 3/4 | 1.46 |
| 4/5 | 1.32 |
| 5/6 | 1.21 |
| 6/7 | 1.16 |
| 7/8 | 1.09 |

| | RATIOS | 260 | 262 | 264 | 266 | 267 | 268 | 269 |
|---|---|---|---|---|---|---|---|---|
| REVERSE 2 | -1.679 | | | X | | X | | |
| REVERSE 1 | -2.363 | | X | | | X | | |
| REVERSE LOW | -3.326 | X | | | | X | | |
| 1 | 3.357 | X | | | | | X | |
| 2 | 2.385 | | X | | | | X | |
| 3 | 1.695 | | | X | | | X | |
| 4 | 1.259 | | | | X | | X | |
| 5 | 1.000 | | | X | X | | | |
| 6 | 0.853 | | X | | X | | | |
| 7 | 0.7723 | X | | | X | | | |
| 8 | 0.627 | | | | X | | | X |

(X = ENGAGED CLUTCH)

| RATIO SPREAD | |
|---|---|
| 1/6 | 3.936 |
| 1/7 | 4.347 |
| 1/8 | 5.354 |
| RATIO STEPS | |
| REVERSE LOW /1 | 0.99 |
| 1/2 | 1.41 |
| 2/3 | 1.41 |
| 3/4 | 1.35 |
| 4/5 | 1.26 |
| 5/6 | 1.17 |
| 6/7 | 1.10 |
| 7/8 | 1.23 |

| RATIO SPREAD | |
|---|---|
| 1/6 | 9.772 |
| 1/7 | 11.372 |
| 1/8 | 12.391 |
| RATIO STEPS | |
| REVERSE LOW /1 | 0.977 |
| 1/2 | 2.57 |
| 2/3 | 1.64 |
| 3/4 | 1.46 |
| 4/5 | 1.32 |
| 5/6 | 1.21 |
| 6/7 | 1.16 |
| 7/8 | 1.09 |

| | RATIOS | 360 | 362 | 364 | 366 | 367 | 368 | 369 |
|---|---|---|---|---|---|---|---|---|
| REVERSE 2 | -1.880 | | | X | | X | | |
| REVERSE 1 | -3.080 | | X | | | X | | |
| REVERSE LOW | -7.904 | X | | | | X | | |
| 1 | 8.091 | X | | | | | X | |
| 2 | 3.153 | | X | | | | X | |
| 3 | 1.924 | | | X | | | X | |
| 4 | 1.321 | | | | X | | X | |
| 5 | 1.000 | | | | X | X | | |
| 6 | 0.828 | | X | | | X | | |
| 7 | 0.7115 | X | | | | X | | |
| 8 | 0.653 | | | | X | | | X |

(X = ENGAGED CLUTCH)

SEVEN SPEED TRANSMISSIONS WITH ALL POSITIVE ROTATION COMPONENTS IN FORWARD SPEEDS

TECHNICAL FIELD

The present invention relates to power transmissions having four planetary gear sets that are controlled by six torque-transmitting devices to provide seven forward speed ratios and three reverse speed ratios.

BACKGROUND OF THE INVENTION

Passenger vehicles include a powertrain that is comprised of an engine, a multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; and U.S. Pat. No. 6,422,969 issued to Raghavan and Usoro on Jul. 23, 2002.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five- or six-speed devices due to the size and complexity of these transmissions.

Seven-speed transmissions are disclosed in U.S. Pat. No. 6,623,397 issued to Raghavan, Bucknor and Usoro. Seven-speed transmissions provide further improvements in acceleration and fuel economy over six-speed transmissions. However, like the six-speed transmission discussed above, the development of seven-speed transmissions has been precluded because of complexity, size and cost.

SUMMARY OF THE INVENTION

An improved seven speed transmission having four planetary gear sets controlled to provide seven forward speed ratios and three reverse speed ratios is provided. The various embodiments of the improved transmission have rotation in the same direction in all forward speeds for any internal components rotating. Because all forward range internal rotational speeds are of the same direction, counter rotating elements are eliminated, which ensures low component speeds. The elimination of counter rotating elements also improves clutch life and the reduced internal speeds should result in very low associated spin losses. The internal speeds achieved are compatible with very high engine speeds, e.g., engine speeds up to 8,000 revolutions per minutes (rpm). The very low internal speeds allow for reduced internal differential speeds which improves gear and bearing life. As described below, various embodiments of the transmission provide for reduced clutch loading, i.e., reduced clutch torque, which is desirable for clutch-to-clutch type transmissions.

In one aspect of the invention, the transmission has four planetary gear sets, each of which includes a first, second and third member, which members may comprise a sun gear, a ring gear or a planet carrier assembly member.

In referring to the first, second, third and fourth gear sets in this description, and in the claims, these sets may be counted "first" to "fourth" in any order in the drawings (i.e., left to right, right to left, etc.). Additionally, the first, second or third members of each gear set may be counted "first" to "third" in any order in the drawings (i.e., top to bottom, bottom to top, etc.) for each gear set.

In another aspect of the invention, a first interconnecting member continuously interconnects a first member of the first planetary gear set with a first member of the second planetary gear set.

In yet a further aspect of the invention, a second interconnecting member continuously interconnects the first member of the third planetary gear set with a first member of the fourth planetary gear set.

In still a further aspect of the invention, a third interconnecting member continuously interconnects the second member of the third planetary gear set with the second member of the fourth planetary gear set.

In yet another aspect of the invention, each transmission incorporates an input shaft which is continuously connected with a member of the planetary gear sets and an output shaft which is continuously connects with another member of the planetary gear sets. The input shaft may be continuously connected with the third member of the second planetary gear set and the output shaft may be continuously connected with the third member of the third planetary gear set.

In a further aspect of the invention, a first torque-transmitting mechanism, such as a stationary-type clutch or brake, is operable for selectively interconnecting the third member of the first planetary gear set with the stationary member. Alternatively, the first torque-transmitting mechanism may be operable for interconnecting the third member of the first planetary gear set with the third member of the fourth planetary gear set.

In still a further aspect of the invention, a second torque-transmitting mechanism, such as a clutch, is operable for selectively interconnecting the first member of the first planetary gear set and the first member of the second planetary gear set with the third member of the fourth planetary gear set.

In still a further aspect of the invention, a third torque-transmitting mechanism, such as a clutch, is operable for selectively interconnecting the third member of the second planetary gear set and the third member of the fourth planetary gear set.

In still a further aspect of the invention, a fourth torque-transmitting mechanism, such as a clutch, is operable for selectively interconnecting the third member of the second planetary gear set with the first member of the third planetary gear set.

In still a further aspect of the invention, a fifth torque-transmitting mechanism, such as a stationary-type clutch or brake, is operable for selectively interconnecting the first member of the fourth planetary gear set with the stationary member.

In another aspect of the invention, a sixth torque-transmitting mechanism, such as a stationary-type clutch or brake, is operable for selectively interconnecting the second member of the fourth planetary gear set with the stationary member.

Optionally, a seventh torque-transmitting mechanism may be provided to selectively interconnect a fourth interconnecting member with the stationary member. The fourth interconnecting member continuously interconnects the second member of the first planetary gear set with the third member of the fourth planetary gear set; therefore, these two members are held stationary by application of the seventh torque-transmitting mechanism. With the seventh torque-transmitting mechanism, eight forward speed ratios are achieved.

In still a further aspect of the invention, forward ratio shifts are of the single transition type.

In another aspect of the invention, one of the six torque-transmitting mechanisms selectively interconnects the input member with the first member of the third planetary gear set and another of the torque-transmitting mechanisms selectively interconnects the input member with the third member of the fourth planetary gear set.

In still another aspect of the invention, the first, second and third of the seven forward speed ratios are substantially equivalent in value with respective ones of the reverse speed ratios so that shifting may occur from the first, second and third forward speed ratios to the respective, substantially equivalent reverse speed ratios.

In still another aspect of the invention, one of the torque-transmitting mechanisms selectively interconnects the first member of the fourth planetary gear set with the stationary member, and another of the torque-transmitting mechanisms selectively interconnects the second member of the fourth planetary gear set with the stationary member.

In yet another aspect of the invention, two to the six torque-transmitting mechanisms each selectively interconnect a respective member of one of the planetary gear sets with the stationary member. A first of the two torque-transmitting mechanisms is engaged only during selective ones of the seven forward speed ratios and a second of the torque-transmitting mechanisms is engaged only during the three reverse speed ratios. Thus, because one of the torque-transmitting mechanisms is used for reverse holding only, a static apply clutch design may be employed. The high torque associated with a static apply clutch design is not used in the forward shift sequence. The second grounding clutch is used in the forward shift sequence.

In yet another aspect of the invention, two of the six torque-transmitting mechanisms are stationary-type clutches and four of the six torque-transmitting mechanisms are rotation-type clutches. Alternatively, three of the six torque-transmitting mechanisms may be stationary-type clutches and three of the six torque-transmitting mechanisms may be rotating-type clutches.

In another aspect of the invention, the input shaft is continuously connected with the second planetary gear set and is selectively connectable with the third and fourth planetary gear sets respectively via two of the six torque-transmitting mechanisms. Another one of the six torque-transmitting mechanisms is operable for selectively connecting the second planetary gear set with the fourth planetary gear set. Another two of the six torque-transmitting mechanisms are operable for selectively connecting a different respective member of the fourth planetary gear set with the stationary member and a final one of the torque-transmitting mechanisms is operable for selectively connecting the first planetary gear set with either the fourth planetary gear set or the stationary member. The output shaft is continuously connected with a member of the third planetary gear set.

In still another aspect of the invention, the six torque-transmitting mechanisms are selectively engagable in combinations of two to yield seven forward speed ratios and three reverse speed ratios. Alternatively, if the optional seventh torque-transmitting mechanism is provided selectively connecting the third member of the fourth planetary gear set with the stationary member, the seven torque-transmitting mechanisms are engagable in combinations of two to yield eight forward speed ratios and three reverse speed ratios.

The resulting transmission offers a variety of ratio spread options with very low internal speeds and reduced clutch loading for clutch-to-clutch shifting.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3A is a truth table depicting some of the operating characteristics of the powertrain shown in FIG. 1 when different gear tooth counts are employed than those resulting in the operating characteristics of FIGS. 2A and 2B;

FIG. 3B is a chart depicting other operating characteristics of the transmission of FIG. 1 using the gear tooth counts resulting in a truth table of FIG. 3A;

FIG. 4A is a truth table depicting operating characteristics shown in FIG. 1 using different tooth counts than those resulting in the truth tables of FIGS. 2A and 3A;

DESCRIPTION OF THE PREFERRED EMBODIMENTS

Figures 1, 2A, 2B:
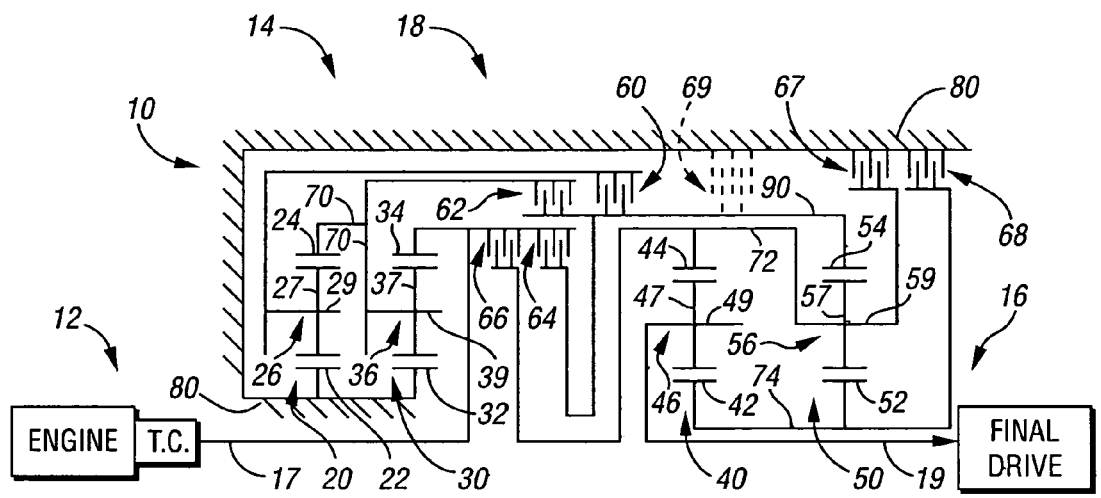
FIG. 1 is a schematic representation of a powertrain including one embodiment of a planetary transmission of the present invention.
FIG. 2A is a truth table depicting some of the operating characteristics of the powertrain shown in FIG. 1.
FIG. 2B is a chart depicting other operating characteristics of the powertrain shown in FIG. 1.

Referring to the drawings, wherein like reference numerals represent the same or corresponding parts through the several views, there is shown in FIG. 1 a powertrain 10 having a conventional engine and torque converter 12, a planetary transmission 14 and a conventional final drive mechanism 16.

The planetary transmission 14 includes an input shaft 17 continuously connected with the engine and torque converter 12, a planetary gear arrangement 18, and an output shaft 19 continuously connected with the final drive mechanism 16. The planetary gear arrangement 18 includes four planetary gear sets 20, 30, 40 and 50.

The planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34 and a planet carrier assembly member 36. The planet carrier assembly member 36 includes a plurality of pinion gears 37 rotatably mounted on the carrier member 39 and disposed in meshing relationship with both the sun gear member 32 and the ring gear member 34.

The planetary gear set 40 includes a sun gear member 42, a ring gear member 44, and a planet carrier assembly member 46. The planet carrier assembly member 46 includes a plurality of pinion gears 47 rotatably mounted on the carrier member 49 and disposed in meshing relationship with both the sun gear member 42 and the ring gear member 44.

The planetary gear set 50 includes a sun gear member 52, a ring gear member 54, and a planet carrier assembly member 56. The planet carrier assembly member 56 includes a plurality of pinion gears 57 rotatably mounted on the carrier member 59 and disposed in meshing relationship with both the sun gear member 52 and the ring gear member 54.

The input shaft 17 is continuously connected with the ring gear member 34. The output shaft 19 is continuously connected with the carrier member 49. The ring gear member 24 is continuously connected with carrier member 39 through the interconnecting member 70. The ring gear member 44 is continuously connected with the carrier member 59 through the interconnecting member 72. The sun gear member 42 is continuously connected with the sun gear member 52 through the interconnecting member 74. The carrier member 29 is selectively connectable with the ring gear member 54 through the clutch 60, which may also be referred to as the LL clutch. The ring gear member 24 is selectively connectable with the ring gear member 54 through the clutch 62, which also may be referred to herein as the L clutch. The ring gear member 34 is selectively connectable with the ring gear member 54 through the clutch 64, which may also be referred to herein as the C2 clutch. The ring gear member 34 is selectively connectable with the ring gear member 44 through the clutch 66, which may be also referred to herein as the C3 clutch. The planet carrier assembly member 56 is selectively connectable with the transmission housing 80 through a stationary type clutch or brake 67, which may also be referred to herein as the C5 clutch. The sun gear member 52 is selectively connectable with the transmission housing 80 through a stationary type clutch or brake 68, which may also be referred to herein as the C6 clutch. An optional stationary type clutch or brake 69 shown in phantom interconnects a drum 90 to the stationary housing 80, thereby effectively connecting the ring gear member 54 with the stationary housing 80. The optional clutch 69 may be referred to herein as the C4 clutch. When the C4 clutch is present, eight forward speed ratios may be achieved.

As shown in FIG. 2A, and in particular the truth table disclosed therein, the torque-transmitting mechanisms are selectively engaged in combinations of two to provide seven forward speed ratios (eight forward speed ratios if the C4 clutch 69 is present) and three reverse speed ratios. The torque-transmitting mechanisms 60, 62, 64, 66, 67, 68 and 69 are preferably of the multiple disk-type, fluid actuated friction-drive establishing device which are commonly used in planetary gear transmissions.

The Reverse 2 speed ratio is established with the engagement of the C2 clutch 64 and the C5 clutch 67. The C2 clutch 64 connects the ring gear member 34 with the ring gear member 54, and the C5 clutch 67 connects the carrier member 59 with the transmission housing 80. The ring gear member 34 and the ring gear member 54 rotate at the same speed as the input shaft 17. The carrier member 39 rotates at the same speed as the ring gear member 24. The sun gear members 22 and 32 do not rotate. The carrier member 39 rotates at a speed determined from the speed of the ring gear member 34 and the ring gear/sun gear tooth ratio of the planetary gear set 30. The carrier member 59 and the ring gear member 44 do not rotate. The sun gear member 52 rotates at the same speed as the sun gear member 42. The sun gear member 52 rotates at a speed determined from the speed of the ring gear member 54 and the ring gear/sun gear tooth ratio of the planetary gear set 50. The carrier member 49 rotates at the same speed as the output shaft 19. The carrier member 49, and therefore the output shaft 19, rotates at a speed determined from the speed of the sun gear member 42 and the ring gear/sun gear tooth ratio of the planetary gear set 40. The numerical value of the Reverse 2 speed ratios is determined utilizing the ring gear/sun gear tooth ratio of the planetary gear sets 40 and 50.

The Reverse 1 speed ratio is established with the engagement of the L clutch 62 and the C5 clutch 67. The L clutch 62 connects the ring gear member 24 with the ring gear member 54, and the C5 clutch 67 connects the carrier member 59 with the transmission housing 80. The ring gear member 34 rotates at the same speed at the input shaft 17. The carrier member 39 and the ring gear member 24 rotate at the same speed as the ring gear member 54. The sun gear member 32 and the sun gear member 22 do not rotate. The carrier member 39 rotates at a speed determined from the speed of the ring gear member 34 and the ring gear/sun gear tooth ratio of the planetary gear set 30. The carrier member 59 and the ring gear member 44 do not rotate. The sun gear member 52 rotates at the same speed as the sun gear member 42. The sun gear member 52 rotates at a speed determined from the speed of the ring gear member 54 and the ring gear/sun gear tooth ratio of the planetary gear set 50. The carrier member 49 rotates at the same speed as the output shaft 19. The carrier member 49, and therefore the output shaft 19, rotates at a speed determined from the speed of the sun gear member 42 and the ring gear/sun gear tooth ratio of the planetary gear set 40. The numerical value of the Reverse one speed ratio is determined utilizing the ring gear/sun gear tooth ratios of the planetary gear sets 30, 40 and 50.

The Reverse Low speed ratio is established with the engagement of the LL clutch 60 and the C5 clutch 67. The LL clutch 60 connects the carrier member 29 with the ring gear member 54, and the C5 clutch 67 connects the carrier member 59 with the transmission housing 80. The ring gear member 34 rotates at the same speed as the input shaft 17. The carrier member 39 rotates at the same speed as the ring gear member 24. The sun gear members 22 and 32 do not rotate. The carrier member 39 rotates at a speed determined from the speed of the ring gear member 34 and the ring gear/sun gear tooth ratio of the planetary gear set 30. The carrier member 29 rotates at the same speed as the ring gear member 54. The carrier member 29 rotates at a speed determined from the speed of the carrier member 39 and the ring gear/sun gear tooth ratio of the planetary gear set 20. The carrier member 59 and the ring gear member 44 do not rotate. The sun gear member 52 rotates at the same speed as the sun gear member 42. The sun gear member 52 rotates at a speed determined from the speed of the ring gear member 54 and the ring gear/sun gear tooth ratio of the planetary gear set 50. The carrier member 49 rotates at the same speed as the output shaft 19. The carrier member 49, and therefore the output shaft 19, rotates at a speed determined from the speed of the sun gear member 42 and the ring gear/sun gear tooth ratio of the planetary gear set 40. The numerical value of the Reverse Low speed ratio is determined utilizing the ring gear/sun gear tooth ratios of the planetary gear sets 20, 30, 40 and 50.

The first forward speed ratio, which may also be referred to herein as Low, is established with the engagement of the LL clutch 60 and the C6 clutch 68. The LL clutch 60 connects the carrier member 29 with the ring gear member 54, and the C6 clutch 68 connects the sun gear member 52 with the transmission housing 80. The ring gear member 34 rotates at the same speed as the input shaft 17. The carrier member 39 rotates at the same speed as the ring gear member 24. The sun gear members 22 and 32 do not rotate. The carrier member 39 rotates at a speed determined from the speed of the ring gear member 34 and the ring gear/sun gear tooth ratio of the planetary gear set 30. The ring gear member 24 rotates at the same speed as the carrier member 39. The carrier member 29 rotates at a speed determined by the speed of the ring gear member 24 and the ring gear/sun gear tooth ratio of the planetary gear set 20. The carrier member 59 rotates at the same speed as ring gear member 44. The sun gear members 42 and 52 do not rotate. The carrier member 59 rotates at a speed determined from the speed of the ring gear member 54 and the ring gear/sun gear tooth ratio of the planetary gear set 50. The carrier member 49 rotates at the same speed as the output shaft 19. The carrier member 49, and therefore the output shaft 19, rotates at a speed determined from the speed of the ring gear member 44 and the ring gear/sun gear tooth ratio of the planetary gear set 40. The numerical value of the first (Low) forward speed ratio is determined utilizing the ring gear/sun gear tooth ratios of the planetary gear sets 20, 30, 40 and 50.

In a simple planetary gear set, when the sun gear member is held stationary and power is applied to the ring gear member of a simple planetary gear set, the planet gear members rotate in response to the power applied to the ring gear member and thus "walk" circumferentially about the fixed sun gear member to effect rotation of the carrier member in the same direction as the direction in which the ring gear member is being rotated.

When any two members of a simple planetary gear set rotate in the same direction and at the same speed, the third member is forced to turn at the same speed, and in the same direction. For example, when the sun gear member and the ring gear member rotate in the same direction, and at the same speed, the planet gear members do not rotate about their own axes but rather act as wedges to lock the entire unit together to effect what is known as direct drive. That is, the carrier member rotates with the sun and ring gears.

However, when the two gear members rotate in the same direction, but at different speeds, the direction in which the third gear member rotates may often be determined simply by visual analysis, but in many situations the direction will not be obvious and can only be accurately determined by knowing the number of teeth present on all the gear members of the planetary gear set.

Whenever the carrier member is restrained from spinning freely, and power is applied to either the sun gear member or the ring gear member, the planet gear members act as idlers. In that way the driven member is rotated in the opposite direction as the drive member. Thus, in many transmission arrangements when the reverse drive range is selected, a torque transfer device serving as a brake is actuated frictionally to engage the carrier member and thereby restrain it against rotation so that power applied to the sun gear member will turn the ring gear member in the opposite direction. Thus, if the ring gear member is operatively connected to the drive wheels of a vehicle, such an arrangement is, capable of reversing the rotational direction of the drive wheels, and thereby reversing the direction of the vehicle itself.

In a simple set of planetary gear members, if any two rotational speeds of the sun gear member, the carrier member and the ring gear member are known, then the speed of the third member can be determined using a simple rule. The rotational speed of the carrier member is always proportional to the speeds of the sun gear member and the ring gear member, weighted by their respective numbers of teeth. For example, a ring gear member may have twice as many teeth as the sun gear member in the same set. The speed of the carrier member is then the sum of two-thirds the speed of the ring gear member and one-third the speed of the sun gear member. If one of these three members rotates in an opposite direction, the arithmetic sign is negative for the speed of that member in mathematical calculations.

The torque on the sun gear member, the carrier member and the ring gear member can also be simply related to one another if this is done without consideration of the masses of the gears, the acceleration of the gears, or friction within the gear set, all of which have a relatively minor influence in a well designed transmission. The torque applied to the sun gear member of a simple planetary gear set must balance the torque applied to the ring gear member, in proportion to the number of teeth on each of these gears. For example, the torque applied to a ring gear member with twice as many teeth as the sun gear member in that set must be twice that applied to the sun gear member, and must be applied in the same direction. The torque applied to the planet carrier assembly member must be equal in magnitude and opposite in direction to the sum of the torque on the sun gear member and the torque on the ring gear member.

As will be well understood by those skilled in the art, members of the gear sets 20, 30, 40 and 50 rotating during the first forward speed ratio all rotate in the same direction. For instance, with respect to the planetary gear set 30, if the input shaft 17 (and therefore the ring gear member 34) is rotating clockwise, because the sun gear member 32 is held stationary, the carrier member 39 and the pinion gears 37 rotate in the same direction as the ring gear member 34. Because the carrier member 39 is continuously connected with the ring gear member 24 and the sun gear member 22 is stationary, the ring gear member 24, the carrier member 29 and the pinion gears 27 also rotate in a clockwise direction. Moving to the planetary gear set 50, because the ring gear member 54 is connected with the carrier member 29 via the LL clutch 60 and the C6 clutch 68 holds the sun gear member 52 stationary, the ring gear member 54, the carrier member 59 and the pinion gears 57 rotate in a clockwise direction. With respect to the planetary gear set 40, because the ring gear member 44 is continuously connected with the carrier member 59 and the sun gear member 42 does not rotate, the carrier member 49, the pinion gears 47 and also the output shaft 19 all rotate in the same clockwise direction as the carrier member 59.

The second forward speed ratio is established with the engagement of the L clutch 62 and the C6 clutch 68. The L clutch 62 connects the ring gear member 24 with the ring gear member 54, and the C6 clutch 68 connects the sun gear member 52 with the transmission housing 80. The ring gear member 34 rotates at the same speed as the input shaft 17. The carrier member 39 and the ring gear member 24 rotate at the same speed as the ring gear member 54. The sun gear members 22 and 32 do not rotate. The carrier member 39 rotates at a speed determined from the speed of the ring gear member 34 and the ring gear/sun gear tooth ratio of the planetary gear set 30. The carrier member 59 rotates at the same speed as the ring gear member 44. The sun gear members 42 and 52 do not rotate. The carrier member 59 rotates at a speed determined from the speed of the ring gear member 54 and the ring gear/sun gear tooth ratio of the planetary gear set 50. The carrier member 49 rotates at the same speed as the output shaft 19. The carrier member 49, and therefore the output shaft 19, rotates at a speed determined from the speed of the ring gear member 44 and the ring gear/sun gear tooth ratio of the planetary gear set 40. The numerical value of the second forward speed ratio is determined utilizing the ring gear/sun gear tooth ratios of the planetary gear sets 30, 40 and 50.

As with the first forward speed ratio, members of the gear sets 20, 30, 40 and 50 rotating during the second forward speed ratio all rotate in the same direction. For instance, with respect to the planetary gear set 30, if the input shaft 17 (and therefore the ring gear member 34) is rotating clockwise, because the sun gear member 22 is held stationary, the carrier member 39 and the pinion gears 37 rotate in the same direction as the ring gear member 34. Because the carrier member 39 is continuously connected with the ring gear member 24 and the sun gear member 22 is stationary, the ring gear member 24, the carrier member 29, and the pinion gears 27 also rotate in a clockwise direction. Moving to the planetary gear set 50, because the ring gear member 54 is connected with the ring gear member 24, via the L clutch 62 and the C6 clutch 68 holds the sun gear member 52 stationary, the ring gear member 54, carrier member 59 and the pinion gears 57 also rotate in a clockwise direction. With respect to planetary gear set 40, because the ring gear member 44 is continuously connected with the carrier member 59 and the sun gear member 42 does not rotate, the ring gear member 44, the carrier member 49, the pinion gears 47 and also the output shaft 19 all rotate in the same clockwise direction as the carrier member 59.

The third forward speed ratio is established with the engagement of the C2 clutch 64 and the C6 clutch 68. The C2 clutch 64 connects the ring gear member 34 with the ring gear member 54, and the C6 clutch 68 connects the sun gear member 52 with the transmission housing 80. The ring gear member 34 and the ring gear member 54 rotate at the same speed as the input shaft 17. The carrier member 39 rotates at the same speed as the ring gear member 24. The sun gear members 22 and 32 do not rotate. The carrier member 39 rotates at a speed determined from the speed of the ring gear member 34 and the ring gear/sun gear tooth ratio of the planetary gear set 30. The carrier member 59 rotates at the same speed as the ring gear member 44. The sun gear members 42 and 52 do not rotate. The carrier member 59 rotates at a speed determined from the speed of the ring gear member 54 and the ring gear/sun gear tooth ratio of the planetary gear set 50. The carrier member 49 rotates at the same speed as the output shaft 19. The carrier member 49, and therefore the output shaft 19, rotates at a speed determined from the speed of the ring gear member 44 and the ring gear/sun gear tooth ratio of the planetary gear set 40. The numerical value of the third forward speed is determined utilizing the ring gear/sun gear tooth ratios of the planetary gear sets 30, 40 and 50.

As will be understood by those skilled in the art, as with the first and second forward speed ratios, members of the gear sets 20, 30, 40 and 50 rotating during the third forward speed ratio rotate in the same direction. For instance, with respect to the planetary gear set 30, if the input shaft 17 (and therefore ring gear member 34) is rotating clockwise, because the sun gear member 32 is held stationary, the carrier member 39 and the pinion gears 37 rotate in the same direction as the ring gear member 34. Because the carrier member 39 is continuously connected with the ring gear member 24, and because the sun gear member 22 is stationary, the carrier member 29 and the pinion gears 27 also rotate in a clockwise direction. Moving to the planetary gear set 50, because the ring gear member 54 is connected with the ring gear member 34 by the C2 clutch 64, and because the sun gear member 52 is held stationary by the C6 clutch 68, carrier member 39 and pinion gears 37 rotate in a clockwise direction. With respect to planetary gear set 40, because the ring gear member 44 is continuously connected with carrier member 59, and the sun gear member 42 does not rotate, the carrier member 49, the pinion gears 47 and also the output shaft 19 all rotate in the same clockwise direction as the carrier member 59.

The fourth forward speed ratio is established with the engagement of the C3 clutch 66 and the C6 clutch 68. The C3 clutch 66 connects the ring gear member 34 with the ring gear member 44, and the C6 clutch 68 connects the sun gear member 52 with the transmission housing 80. The ring gear member 34, the ring gear member 44 and the carrier member 59 rotate at the same speed as the input shaft 17. The carrier member 39 rotates at the same speed as the ring gear member 24. The sun gear members 22 and 32 do not rotate. The carrier member 39 rotates at a speed determined from the speed of the ring gear member 34 and the ring gear/sun gear tooth ratio of the planetary gear set 30. The sun gear members 42 and 52 do not rotate. The carrier member 49 rotates at the same speed as the output shaft 19. The carrier member 49, and therefore the output shaft 19, rotates at a speed determined from the speed of the ring gear member 44 and the ring gear/sun gear tooth ratio of the planetary gear set 40. The numerical value of the fourth forward speed ratio is determined utilizing the ring gear/sun gear tooth ratios of the planetary gear sets 30 and 40.

As will be understood by those skilled in the art, members of the gear sets 20, 30, 40 and 50 rotating during the fourth forward speed ratio all rotate in the same direction. For instance with respect to the planetary gear set 30, if the input shaft 17 (and therefore the ring gear member 34) is rotating clockwise, because the sun gear member 32 is held stationary, the carrier member 39 and the pinion gears 37 rotate in the same direction as the ring gear member 34. Because the carrier member 39 is connected with the ring gear member 24 and the sun gear member 22 is held stationary, the ring gear member 24, the carrier member 29 and the pinion gears 27 also rotate in a clockwise direction. Moving to the planetary gear set 40, because the ring gear member 44 is connected with the ring gear member 34 via the C3 clutch 66 and the sun gear member 42 is stationary, the carrier member 49, and therefore the output shaft 19, as well as the pinion gears 47 rotate in a clockwise direction. Moving to the planetary gear set 50, because the carrier member 59 is continuously connected with the ring gear member 44, and because the sun gear member 52 is held stationary by the C6 clutch 68, the carrier member 59, the pinion gears 57 and the ring gear member 54 all rotate in a clockwise direction.

The fifth forward speed ratio is established with the engagement of the C2 clutch 64 and the C3 clutch 66. The C2 clutch 64 connects the ring gear member 34 with the ring gear member 54, and the C3 clutch 66 connects the ring gear member 34 with the ring gear member 44. In this configuration, because all of the members of the planetary gear sets 40 and 50 rotate at the same speed as the input shaft 17, the output shaft 19 also rotates at the same speed as the input shaft 17 such that the numerical value of the fifth forward speed ratio is 1.

As will be understood by those skilled in the art, the internal elements of the transmission 14 rotating during the fifth forward speed ratio all rotate in the same direction. For instance, with respect to the planetary gear set 30, if the input shaft 17 (and therefore the ring gear member 34) is rotating clockwise, because the sun gear member 32 is held stationary, the carrier member 39 and the pinion gears 37 rotate in the same direction as the ring gear member 34. Because the carrier member 39 is continuously connected with the ring gear member 24 and the sun gear member 22 is held stationary, the ring gear member 24, the carrier member 29 and the pinion gears 27 also rotate in a clockwise direction. Moving to the planetary gear set 50, because the ring gear member 54 is connected with the ring gear member 34 via the C2 clutch 64, and because the ring gear member 44 is continuously connected with the carrier member 59 and the sun gear member 42 is continuously connected with the sun gear member 52, both the planetary gear sets 40 and 50 have two elements rotating at the same speed, which means that the planetary gear sets 40 and 50 are locked with all elements rotating at the same speed and the same direction.

The sixth forward speed ratio is established with the engagement of the L clutch 62 and the C3 clutch 66. The L clutch 62 connects the ring gear member 24 with the ring gear member 54, the C3 clutch 66 connects the ring gear member 34 with the ring gear member 44. The ring gear member 34, the ring gear member 44 and the carrier member 59 rotate at the same speed as the input shaft 17. The carrier member 39 and the ring gear member 24 rotate at the same speed as the ring gear member 54. The sun gear members 22 and 32 do not rotate. The carrier member 39 rotates at a speed determined from the speed of the ring gear member 34 and the ring gear/sun gear tooth ratio of the planetary gear set 30. The sun gear member 52 rotates at the same speed as the sun gear member 42. The sun gear member 52 rotates at a speed determined from the speed of the carrier member 59, the speed of the ring gear member 54 and the ring gear/sun gear tooth ratio of the planetary gear set 50. The carrier member 49 rotates at the same speed as the output shaft 19. The carrier member 49, and therefore the output shaft 19, rotates at a speed determined from the speed of the ring gear member 44, the speed of the sun gear member 42 and the ring gear/sun gear tooth ratio of the planetary gear set 40. The numerical value of the sixth forward speed ratio is determined utilizing the ring gear/sun gear tooth ratios of the planetary gear sets 30, 40 and 50.

As will be understood by those skilled in the art, members of the gear sets 20, 30, 40 and 50 rotating during the sixth forward speed ratio all rotate in the same direction. For instance, with respect to the planetary gear set 30, if the input shaft 17 (and therefore the ring gear member 34) is rotating clockwise, because the sun gear member 32 is held stationary, the carrier member 39 and the pinion gears 37 rotate in the same direction as the ring gear member 34. Because the carrier member 39 is continuously connected with the ring gear member 24 and the sun gear member 22 is held stationary, the ring gear member 24, the carrier member 29 and the pinion gears 27 also rotate in a clockwise direction. Moving to the planetary gear set 50, because the ring gear member 54 is connected with the ring gear member 24 via the L clutch 62, and the ring gear member 54 rotates in a clockwise direction. Moving to the planetary gear set 40, because the C3 clutch 66 connects the ring gear member 34 with the ring gear member 44, the ring gear member 44 also rotates in a clockwise direction. Because the ring gear member 44 is continuously connected with the carrier member 59, the carrier member 59 also rotates in a clockwise direction. The sun gear members 42 and 52 are continuously connected and therefore rotate in the same direction. The tooth counts of the elements of the planetary gear sets 40 and 50 are chosen so that the sun gear members 42 and 52, the pinion gears 47 and 57 as well as the carrier member 49, and therefore the output shaft 19, also all rotate in a clockwise direction. For instance, the speed ratios shown in the truth table in FIG. 2A reflect the planetary gear set 40 having a ring gear member 44 with 81 teeth, a carrier member 49 with 30 teeth and a sun gear member 42 with 21 teeth, a ring gear member 54 with 81 teeth, and a sun gear member 52 with 28 teeth. Additionally, as will be discussed below with respect to the truth table of FIG. 3A, the ring gear member 44 may have 81 teeth, the sun gear member 42 may have 26 teeth, the ring gear member 54 may have 81 teeth, and the sun gear member 52 may have 37 teeth in order to achieve the unidirectional clockwise rotation in planetary gear sets 40 and 50. Finally, with respect to the truth table of FIG. 4A, discussed below, the same tooth counts as shown above with respect to the truth table of FIG. 3A will result in all clockwise rotation in the planetary gear sets 40 and 50.

The seventh forward speed ratio is established with the engagement of the LL clutch 60 and the C3 clutch 66. The LL clutch 60 connects the carrier member 29 with the ring gear member 54, and the C3 clutch 66 connects the ring gear member 34 with the ring gear member 44. The ring gear member 34, the ring gear member 44 and the carrier member 59 rotate at the same speed as the input shaft 17. The carrier member 39 rotates at the same speed as the ring gear member 24. The sun gear members 22 and 32 do not rotate. The carrier member 39 rotates at a speed determined from the speed of the ring gear member 34 and the ring gear/sun gear tooth ratio of the planetary gear set 30. The carrier member 29 rotates at the same speed as the ring gear member 54. The carrier member 29 rotates at a speed determined from the speed of the ring gear member 24 and the ring gear/sun gear tooth ratio of the planetary gear set 20.

The sun gear member 52 rotates at the same speed as the sun gear member 42. The ring gear member 54 rotates at a speed determined from the speed of the carrier member 59, the speed of the sun gear member 52 and the ring gear/sun gear tooth ratio of the planetary gear set 50. The carrier member 49 rotates at the same speed as the output shaft 19. The carrier member 49, and therefore the output shaft 19, rotates at a speed determined from the speed of the ring gear member 44, the speed of the sun gear member 42 and the ring gear/sun gear tooth ratio of the planetary gear set 40. The numerical value of the seventh forward speed ratio is determined utilizing the ring gear/sun gear tooth ratios of the planetary gear sets 20, 30, 40 and 50.

As will be understood by those skilled in the art, members of the gear sets 20, 30, 40 and 50 rotating during the seventh forward speed ratio all rotate in the same direction. For instance, with respect to the planetary gear set 30, if the input shaft 17 (and therefore the ring gear member 34) is rotating clockwise, because the sun gear member 32 is held stationary, the carrier member 39 and the pinion gears 37 rotate in the same direction as the ring gear member 34. Because the carrier member 39 is continuously connected with the ring gear member 24 and the sun gear member is held stationary, the ring gear member 24, the carrier member 29 and the pinion gears 27 also rotate in a clockwise direction. Moving to the planetary gear sets 40 and 50, because the carrier member 29 is connected with the ring gear member 54 via the LL clutch 60, the ring gear member 54 rotates in a clockwise direction. Because the ring gear member 44 is connected with the ring gear member 34 via the C3 clutch 66, and because the ring gear member 44 is continuously connected with the carrier member 59, the ring gear member 44 and the carrier member 59 also rotate in clockwise direction. The sun gear members 42 and 52 are continuously connected and therefore must rotate in the same direction. The tooth counts of the elements of the planetary gear sets 40 and 50 are chosen so that the sun gear members 42 and 52, the pinion gears 47 and 57 as well as the carrier member 49, and therefore the output shaft 19, also all rotate in a clockwise direction. The tooth counts described above with respect to the discussion of the sixth forward speed ratio for the truth tables in FIGS. 2A, 3A and 4A will result in such unidirectional rotation.

When the optional C4 clutch 69 is present to connect the ring gear member 54 with the stationary housing 80, an eighth forward speed ratio may be established. The eighth forward speed ratio is established with the engagement of the C4 clutch 69 and the C3 clutch 66. The C3 clutch 66 connects the ring gear member 34 with the ring gear member 44. The ring gear member 34, the ring gear member 44 and the carrier member 59 rotate at the same speed as the input shaft 17. The carrier member 39 rotates at the same speed as the ring gear member 24. The sun gear members 22 and 32 do not rotate. The carrier member 39 rotates at a speed determined from the speed of ring gear member 34 and the ring gear/sun gear tooth ratio of the planetary gear set 30. The sun gear member 52 rotates at the same speed as the sun gear member 42. The ring gear member 54 does not rotate. The sun gear member 52 rotates at a speed determined from the speed of the ccarrier member 59 and the ring gear/sun gear tooth ratio of the planetary gear set 50. The carrier member 49 rotates at the same speed as the output shaft 19. The carrier member 49, and therefore the output shaft 19, rotates at a speed determined from the speed of the ring gear member 44, the speed of the sun gear member 42 and the ring gear/sun gear tooth ratio of the planetary gear set 40. The numerical value of the eighth forward speed ratio is determined utilizing the ring gear/sun gear tooth ratios of the planetary gear sets 30, 40 and 50.

As will be understood by those skilled in the art, members of the gear sets 20, 30, 40 and 50 rotating during the eighth forward speed ratio all rotate in the same direction. For instance, with respect to the planetary gear set 30, if the input shaft 17 (and therefore the ring gear member 34) is rotating clockwise, because the sun gear member 32 is held stationary, the carrier member 39 and the pinion gears 37 rotate in the same direction as the ring gear member 34. Because the carrier member 39 is connected with the ring gear member 24 and the sun gear member 22 is held stationary, the carrier member 29 and the pinion gears 27 also rotate in a clockwise direction. Moving to the planetary gear set 40, because the ring gear member 44 is connected with the ring gear member 34 via the C3 clutch 66, the ring gear member 44 rotates in a clockwise direction. Because the ring gear member 44 is continuously connected with the carrier member 59 and because the ring gear member 54 is held stationary by the C4 clutch 69, the carrier member 59, the pinion gears 57 and the sun gear member 52 all rotate in a clockwise direction. Because the sun gear member 42 is continuously connected with the sun gear member 52, it too rotates in a clockwise direction. The carrier member 49, and therefore the output shaft 19, as well as the pinion gears 47 may be made to rotate in a clockwise direction as well if tooth number such as those for the planetary gear set 40 described above with respect to the sixth forward speed ratio and the truth tables of FIGS. 2A, 3A and 4A are utilized.

As set forth above, the engagement schedule for the torque-transmitting mechanisms is shown in the truth table of FIG. 2A. This truth table also provides an example of speed ratios that are available utilizing the following ring gear/sun gear tooth ratios: the value of the tooth ratio of the planetary gear set 20 is 2.45; the value of the tooth ratio of the planetary gear set 30 is 2.45; the value of the tooth ratio of the planetary gear set 40 is 3.86; and the value of the tooth ratio of the planetary gear set 50 is 2.89.

Also, the chart of FIG. 2B describes the ratio steps that are attained utilizing the: sample of tooth ratios given. For example, the step ratio between the first and second forward speed ratios is 1.41, while the step ratio between the Reverse Low ratio and the first forward speed ratio is −0.991. It should be noted that the single and double step forward ratio interchanges are of the single transition variety. A relatively deep first forward speed ratio (i.e., low gear ratio) of 3.357 is achieved, which is useful for towing applications. A relatively close ratio spread of 4.347 is achieved between the first and seventh speed ratios. The transmission 14 may achieve a somewhat higher ratio coverage as set forth in the truth table of FIG. 3A and the chart of FIG. 3B if the following ring gear/sun gear tooth ratios are employed in lieu of those discussed above with respect to the ratios set forth in FIGS. 2A and 2B: a 2.19 tooth ratio for the planetary gear set 20; a 2.45 tooth ratio for the planetary gear set 30; a 3.11 tooth ratio for the planetary gear set 40; and a 2.19 tooth ratio for the planetary gear set 50. With these tooth ratios, a broader ratio coverage is achieved. For example, the ratio spread between the first and seventh forward speed ratios is 5.233, as set forth in the chart of FIG. 3B. The first forward speed ratio (i.e., the low gear ratio) is 4.084, somewhat deeper than the tooth ratios represented in FIG. 2A. To achieve the even wider ratio coverage set forth in FIGS. 4A and 4B, the following tooth ratios may be employed: a 1.53 tooth ratio for the planetary gear set 20; a 1.69 tooth ratio for the planetary gear set 30; a 3.11 tooth ratio for the planetary gear set 40; and a 2.19 tooth ratio for the planetary gear set 50. With these tooth ratios, the ratio spread from the first to the seventh forward speed is 6.659, as set forth in FIG. 4B. Additionally, a very deep first forward speed ratio (i.e., low gear ratio) of 5.015 is achieved.

Figures 4B, 5, 6A:
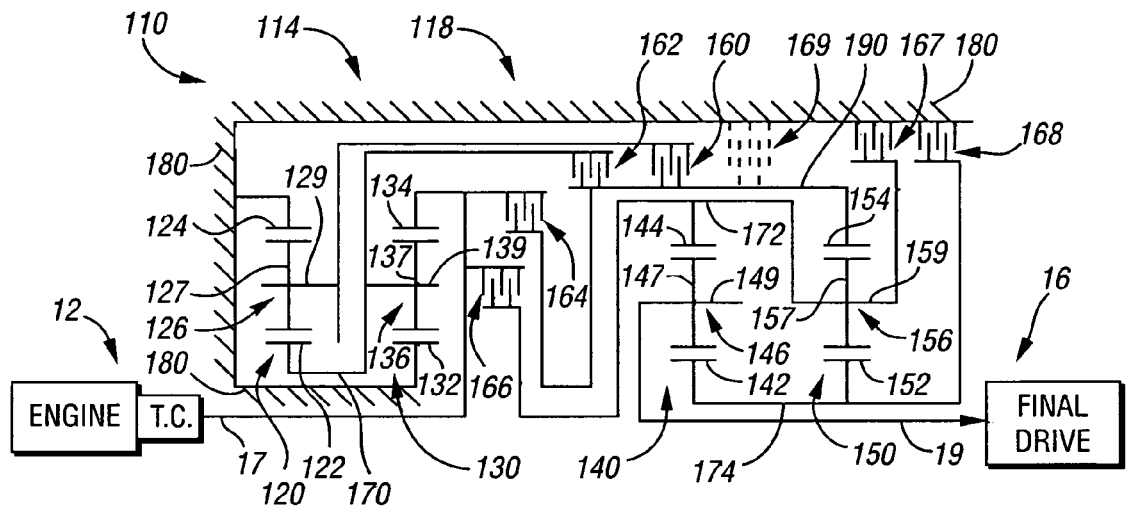
FIG. 4B is a chart depicting other operating characteristics of the powertrain using the gear tooth counts resulting in the truth table shown in FIG. 4A.
FIG. 5 is a schematic representation of a powertrain having a second embodiment of a planetary transmission of the present invention.
FIG. 6A is a truth table depicting some of the operating characteristics of the powertrain shown in FIG. 5.

FIG. 5 shows a powertrain 110 having a conventional engine and torque converter 12, a planetary transmission 114, and a conventional final drive mechanism 16.

The planetary transmission 114 includes an input shaft 17 continuously connected with the engine and torque converter 12, a planetary gear arrangement 118, and an output shaft 19 continuously connected with the final drive mechanism 16. The planetary gear arrangement 118 includes four planetary gear sets 120, 130, 140 and 150.

The planetary gear set 120 includes a sun gear member 122, a ring gear member 124, and a planet carrier assembly member 126. The planet carrier assembly member 126 includes a plurality of pinion gears 127 mounted on a carrier member 129 disposed in meshing relationship with both the sun gear member 122 and the ring gear member 124.

The planetary gear set 130 includes a sun gear member 132, a ring gear member 134 and a planet carrier assembly member 136. The planet carrier assembly member 136 includes a plurality of pinion gears 137 rotatably mounted on the carrier member 139 disposed in meshing relationship with both the sun gear member 132 and the ring gear member 134.

The planetary gear set 140 includes a sun gear member 142, a ring gear member 144, and a planet carrier assembly member 146. The planet carrier assembly member 146 includes a plurality of pinion gears 147 rotatably mounted on the carrier member 149 and disposed in meshing relationship with both the sun gear member 142 and the ring gear member 144.

The planetary gear set 150 includes a sun gear member 152, a ring gear member 154, and a planet carrier assembly member 156. The planet carrier assembly member 156 includes a plurality of pinion gears 157 rotatably mounted on the carrier member 159 and disposed in meshing relationship with both the sun gear member 152 and the ring gear member 154.

The planetary gear arrangement 118 also includes seven torque-transmitting mechanisms 160, 162, 164, 166, 167, and 168 and an optional seventh torque-transmitting mechanism 169. The torque-transmitting mechanisms 160, 162, 164 and 166 are rotating type torque-transmitting mechanisms, commonly termed clutches. The torque-transmitting mechanisms 167, 168 and 169 are stationary type torque-transmitting mechanisms, commonly termed brakes or reaction clutches.

The input shaft 17 is continuously connected with the ring gear member 134, and the output shaft 19 is continuously connected with the carrier member 149. The sun gear member 132 and the ring gear member 124 are continuously connected to the transmission housing 180. The sun gear member 122 is continuously connected with the carrier member 139 through the interconnecting member 170. The ring gear member 144 is continuously connected with the carrier member 159 through the interconnecting member 172. The sun gear member 142 is continuously connected with the sun gear member 152 through the interconnecting member 174.

The carrier member 129 is selectively connectable with the ring gear member 154 through the LL clutch 160. The carrier member 139 is selectively connectable with the ring gear member 154 through the L clutch 162. The input shaft 17 and the ring gear member 134 are selectively connectable with the ring gear member 154 through the C2 clutch 164. The input shaft 17 and the ring gear member 134 are selectively connectable with the ring gear member 144 through the C3 clutch 166. The carrier member 159 is selectively connectable with the transmission housing 180 through the C5 clutch 167. The sun gear member 152 is selectively connectable with the transmission housing 180 through the C6 clutch 168. An optional C4 clutch 169 selectively connects a drum 190 to the stationary housing 180, thereby effectively connecting the ring gear member 154 with the stationary housing 180.

The truth table of FIG. 6A describes the engagement sequence utilized to provide eight forward speed ratios and three reverse speed ratios in the planetary gear arrangement 118 shown in FIG. 2A. As shown and described above for the configuration of FIG. 1, those skilled in the art will understand from the truth table of FIG. 6A how the speed ratios shown are established through the planetary gear sets 120, 130, 140 and 150.

The truth table of FIG. 6A also provides an example of the ratios that can be attained with the planetary gear sets shown in FIG. 5 utilizing the following tooth ratios: value of the tooth ratio of the planetary gear set 120 is 1.57 (ring gear member 24 has 83 teeth; sun gear member 22 has 53 teeth); the value of the tooth ratio of the planetary gear set 130 is 1.57 (ring gear member 34 has 83 teeth; sun gear member 32 has 53 teeth); the value of the tooth ratio of the planetary gear set 140 is 3.12 (ring gear member 44 has 81 teeth; sun gear member 42 has 26 teeth); and the value is the tooth ratio of the planetary gear set 150 is 2.19 (ring gear member 54 has 81 teeth; sun gear member 52 has 37 teeth). These tooth ratios, in conjunction with the engagement schedule of FIG. 6A will result in all rotating members of the gear sets 120, 130, 140, 150 rotating in the same direction in each of the seven (optionally eight) forward speed ratios. Those skilled in the art will readily understand this unidirectional rotation based on the discussion of FIG. 1, above.

Figures 6B, 7, 8A:
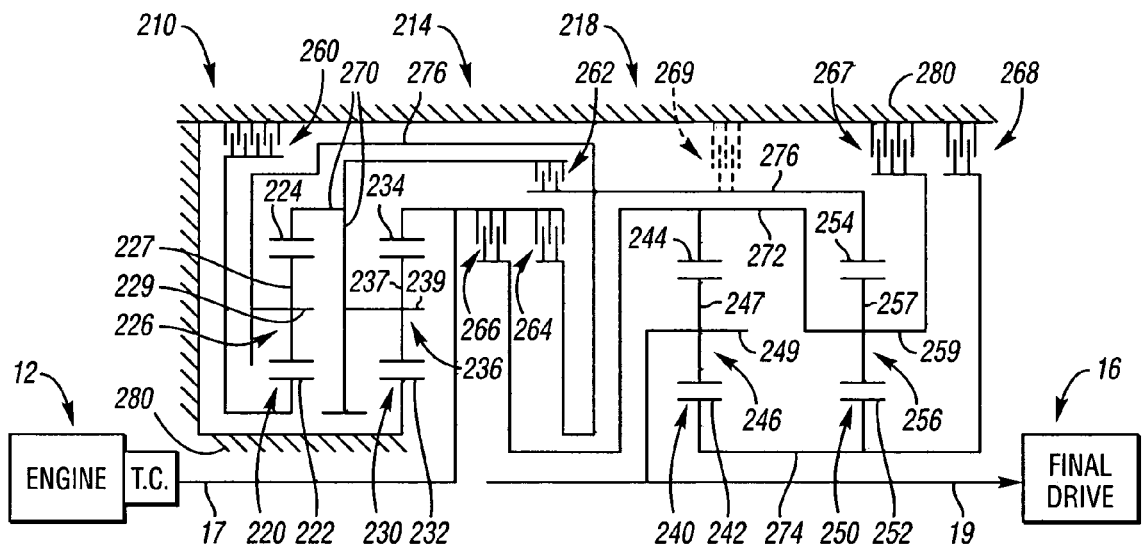
FIG. 6B is a chart depicting other operating characteristics of the powertrain shown in FIG. 5.
FIG. 7 is a schematic representation of a powertrain incorporating a third embodiment of a planetary transmission of the present invention.
FIG. 8A is a truth table depicting some of the operating characteristics of the powertrain shown in FIG. 7.

FIG. 6B shows the ratio steps between the single step ratios in the forward direction as well as the Reverse Low to first forward speed ratio step. For example, the first to second step ratio is 2.57. It should also be noted that the single step and double step forward ratio interchanges are of the single transition variety.

Turning to FIG. 7, a powertrain 210 includes the engine and torque converter 12, a planetary transmission 214 and a final drive mechanism 16. The planetary transmission 214 includes an input shaft 17 continuously connected with the engine and torque converter 12, a planetary gear arrangement 218, and an output shaft 19 continuously connected with the final drive mechanism 16. The planetary gear arrangement 218 includes four planetary gear sets 220, 230, 240, and 250.

The planetary gear set 220 includes a sun gear member 222, a ring gear member 224 and a planet carrier assembly member 226. The planet carrier assembly member 226 includes a plurality of pinion gears 227 rotatably mounted on a carrier member 229 and is disposed in meshing relationship with both the sun gear member 222 and the ring gear member 224.

The planetary gear set 230 includes a sun gear member 232, a ring gear member 234 and planet carrier assembly member 236. The planet carrier assembly member 236 includes a plurality of pinion gears 237 rotatably mounted on a carrier member 239 and the ring gear member 234.

The planetary gear set 240 includes a sun gear member 242, a ring gear member 244 and a planet carrier assembly member 246. The planet carrier assembly member 246 includes a plurality of pinion gears 247 rotatably mounted on a carrier member 249 and disposed in meshing relationship with both the sun gear member 242 and the ring gear member 244.

The planetary gear set 250 includes a sun gear member 252, a ring gear member 254, and a planet carrier assembly member 256. The planet carrier assembly member 256 includes a plurality of pinion gears 257 rotatably mounted on a carrier member 259 and disposed in meshing relationship with both the sun gear member 252 and the ring gear member 254.

The planetary gear arrangement 218 also includes six torque-transmitting mechanisms 260, 262, 264, 266, 267, 268, and an optional seventh torque-transmitting mechanism 269. The torque-transmitting mechanisms 262, 264 and 266 are rotating type torque-transmitting mechanisms, commonly termed clutches. The torque-transmitting mechanisms 260, 267, 268, and 269 are stationary type torque-transmitting mechanisms, commonly termed brakes or reaction clutches.

The input shaft 17 is continuously connected with the ring gear member 234, and the output shaft 19 is continuously connected with the carrier member 247. The sun gear member 232 is continuously connected with the transmission housing 280. The ring gear member 224 is continuously connected with the carrier member 239 through the interconnecting member 270. The interconnecting member 270 may be one component or separate components. The ring gear member 244 is continuously connected with the carrier member 259 through the interconnecting member 272. The sun gear member 242 is continuously connected with the sun gear member 252 through the interconnecting member 274. The carrier member 229 is continuously connected with the ring gear member 254 by the interconnecting member 276 which may also be referred to as a sleeve.

The sun gear member 222 is selectively connectable with the transmission housing 280 through the LL clutch 260. The ring gear member 224 is selectively. connectable with the ring gear member 254 through the L clutch 262. The input shaft 17 and the ring gear member 234 are selectively connectable with the ring gear member 254 through the C2 clutch 264. The input shaft 17 and the ring gear member 234 are selectively connectable with the ring gear member 244 through the C3 clutch 266. The carrier member 259 is selectively connectable with the transmission housing 280 through the C5 clutch 267. The sun gear member 252 is selectively connectable with the transmission housing 280 through the C6 clutch 268. The sleeve 276, and therefore the ring gear member 254, is selectively connectable with the transmission housing 280 through the optional C4 clutch 269.

Figures 8B, 9, 10A, 10B:
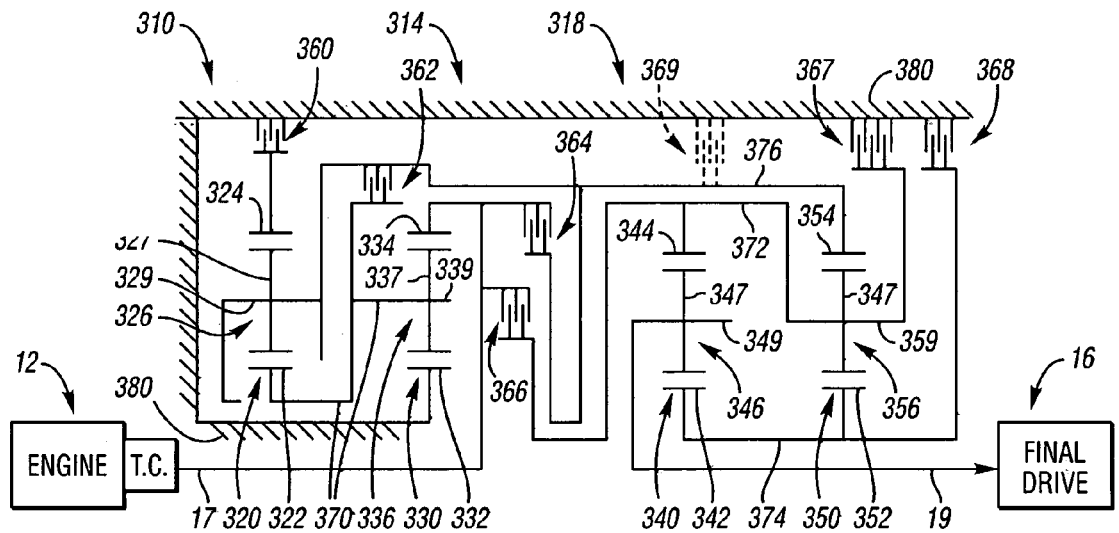
FIG. 8B is a chart depicting other operating characteristics of the powertrain shown in FIG. 7.
FIG. 9 is a schematic representation of a powertrain incorporating a fourth embodiment of a planetary transmission of the present invention.
FIG. 10A is a truth table depicting some of the operating characteristics of the powertrain shown in FIG. 9.
FIG. 10B is a chart depicting other operating characteristics of the powertrain shown in FIG. 9.

The truth table of FIG. 8A describes the engagement sequence utilized to provide eight forward speed ratios and three reverse speed ratios in the planetary gear arrangement 218 shown in FIG. 7. As shown and described above for the configuration of FIG. 1, those skilled in the art will understand from the truth table of FIG. 8A how the speed ratios are established through the planetary gear sets 220, 230, 240 and 250. The truth table of FIG. 8A also provides an example of the ratios that can be attained with the planetary gear arrangement 218 shown in FIG. 7 utilizing the following sample tooth ratios: the value of the tooth ratio of the planetary gear set 220 is 2.45 (ring gear member 224 has 81 teeth; sun gear member 222 has 33 teeth); the value of the tooth ratio of the planetary gear set 230 is 245 (ring gear member 234 has 81 teeth; sun gear member 232 has 33 teeth); the value of the tooth ratio of the planetary gear set 240 is 3.86 (ring gear member 244 has 81 teeth; sun gear member 242 has 21 teeth); and the value of the tooth ratio of the planetary gear set 250 is 2.89 (ring gear member 254 has 81 teeth; sun gear member 252 has 28 teeth). These tooth ratios, in conjunction with the engagement schedule of FIG. 8A, will result in all rotating members of the gear sets 220, 230, 240 and 250 rotating in the same direction in each of the seven (optionally eight) forward speed ratios. Those skilled in the art will readily understand this unidirectional rotation based on the discussion of FIG. 1, above. Also shown in FIG. 8B are the ratio steps between the single step ratios in the forward direction as well as the Reverse Low to first forward speed ratio step. For example, the first to second step ratio is 1.41. It should also be noted that the single and double step forward ratio interchanges are of the single transition variety. A relatively close overall ratio between the first forward speed and the seventh forward speed ratio is 4.34.

Turning to FIG. 9, a powertrain 310 includes the engine and torque converter 12, a planetary transmission 314 and a final drive mechanism 16. The planetary transmission 314 includes an input shaft 17 continuously connected with the engine and torque converter 12, a planetary gear arrangement 318, and an output shaft 19 continuously connected with the final drive mechanism 16. The planetary gear arrangement 318 includes four planetary gear sets 320, 330, 340, and 350.

The planetary gear set 320 includes a sun gear member 322, a ring gear member 324 and a planet carrier assembly member 326. The planet carrier assembly member 326 includes a plurality of pinion gears 327 rotatably mounted on a carrier member 329 and is disposed in meshing relationship with the sun gear member 322 and the ring gear member 324.

The planetary gear set 330 includes a sun gear member 332, a ring gear member 334 and planet carrier assembly member 336. The planet carrier assembly member 336 includes a plurality of pinion gears 337 rotatably mounted on a carrier member 339 and disposed in meshing relationship with both the sun gear member 332 and the ring gear member 334.

The planetary gear set 340 includes a sun gear member 342, a ring gear member 344 and a planet carrier assembly member 346. The planet carrier assembly member 346 includes a plurality of pinion gears 347 rotatably mounted on a carrier member 349 and disposed in meshing relationship with both the sun gear member 342 and the ring gear member 344.

The planetary gear set 350 includes a sun gear member 352, a ring gear member 354, and a planet carrier assembly member 356. The planet carrier assembly member 356 includes a plurality of pinion gears 357 rotatably mounted on a carrier member 359 and disposed in meshing relationship with both the sun gear member 352 and the ring gear member 354.

The planetary gear arrangement 318 also includes six torque-transmitting mechanisms 360, 362, 364, 366, 367, and 368, and an optional seventh torque-transmitting mechanism 369. The torque-transmitting mechanisms 362, 364 and 366 are rotating type torque-transmitting mechanisms, commonly termed clutches. The torque-transmitting mechanisms 360, 367, 368, and 369 are stationary type torque-transmitting mechanisms, commonly termed brakes or reaction clutches.

The input shaft 17 is continuously connected with the ring gear member 334, and the output shaft 19 is continuously connected with the carrier member 349. The sun gear member 332 is continuously connected with the transmission housing 380. The sun gear member 322 is continuously connected with the carrier member 339 through the interconnecting member 370. The interconnecting member 370 may be one component or separate components. The ring gear member 344 is continuously connected with the carrier member 359 through the interconnecting member 372. The sun gear member 342 is continuously connected with the sun gear member 352 through the interconnecting member 374. The carrier member 329 is continuously connected with the ring gear member 354 through the interconnecting member 376, which may also be referred to as a sleeve.

The ring gear member 324 is selectively connectable with the transmission housing 380 through the LL clutch 360. The carrier member 329 is selectively connectable with the carrier member 339 through the L clutch 362. The input shaft 17 and the ring gear member 334 are selectively connectable with the ring gear member 354 through the C2 clutch 364. The input shaft 17 and the ring gear member 334 are selectively connectable with the ring gear member 344 through the C3 clutch 366. The carrier member 359 is selectively connectable with the transmission housing 380 through the C5 clutch 367. The sun gear member 352 is selectively connectable with the transmission housing 380 through the C6 clutch 368. The optional C4 clutch 369 selectively connects the sleeve 376, and therefore the carrier member 329 and the ring gear member 354 to the transmission housing 380.

The truth table of FIG. 10A describes the engagement sequence utilized to provide eight forward speed ratios and three reverse speed ratios in the planetary gear arrangement 318 shown in FIG. 9. As shown and described above for the configuration of FIG. 1, those skilled in the art will understand from the truth table of FIG. 10A how the speed ratios are established through the planetary gear sets 320, 330, 340 and 350. The truth table of FIG. 10A also provides an example of the ratios that can be attained with the planetary gear arrangement 318 shown in FIG. 9 utilizing the following sample tooth ratios: the value of the tooth ratio of the planetary gear set 320 is 1.57 (ring gear member 324 has 831 teeth; sun gear member 322 has 53 teeth); the value of the tooth ratio of the planetary gear set 330 is 1.57 (ring gear member 334 has 83 teeth; sun gear member 332 has 53 teeth); the value of the tooth ratio of the planetary gear set 340 is 3.11 (ring gear member 344 has 81 teeth; sun gear member 342 has 26 teeth); and the value of the tooth ratio of the planetary gear set 350 is 2.19 (ring gear member 354 has 81 teeth; sun gear member 352 has 37 teeth). These tooth ratios, in conjunction with the engagement schedule of FIG. 10A, will result in all rotating members of the gear sets 320, 330, 340 and 350 rotating in the same direction in each of the seven (optionally eight) forward speed ratios. Those skilled in the art will readily understand this unidirectional rotation based on the discussion of FIG. 1, above. Also shown in FIG. 10B are the ratio steps between the single step ratios in the forward direction as well as the Reverse Low to first forward speed ratio step. For example, the first to second step ratio is 2.57. A very deep ratio of 8.091 is achieved in the first (low) gear ratio. A wide ratio spread of 11.372 is achieved between the first and seventh forward speed ratios. It should also be noted that the single and double step forward ratio interchanges are of the single transition variety.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
an input shaft;
an output shaft;
first, second, third and fourth planetary gear sets each having a first, a second and a third member;
a first interconnecting member continuously interconnecting said first member of said first planetary gear set with said first member of said second planetary gear set;
a second interconnecting member continuously interconnecting said first member of said third planetary gear set with said first member of said fourth planetary gear set;
a third interconnecting member continuously interconnecting said second member of said third planetary gear set with said second member of said fourth planetary gear set;
said second member of said second planetary gear set being continuously connected with a stationary member;
said input shaft being continuously connected with said a member of said planetary gear sets and said output shaft being continuously connected with another member of said planetary gear sets; and
six torque-transmitting mechanisms, operable for selectively interconnecting said members of said planetary gear sets with said input shaft, with said stationary member or with other members of said planetary gear sets, said six torque-transmitting mechanisms being engaged in combinations of two to establish seven forward speed ratios and three reverse speed ratios between said input shaft and said output shaft; wherein any of said members of said planetary gear sets rotating during said seven forward speed ratios rotate in one direction.

2. The multi-speed transmission of claim 1, wherein one of said six torque-transmitting mechanisms selectively interconnects said input member with said first member of said third planetary gear set and another of said torque-transmitting mechanisms selectively interconnects said input member with said third member of said fourth planetary gear set.

3. The multi-speed transmission of claim 1, a first, a second and a third of said seven forward speed ratios are substantially equivalent in value with respective ones of said three reverse speed ratios such that shifting may occur from said first, second and third forward speed ratios to said respective substantially equivalent reverse speed ratios.

4. The multi-speed transmissions of claim 1, wherein said input shaft is continuously connected with said third member of said second planetary gear set and said output shaft is continuously connected with said third member of said third planetary gear set.

5. The multi-speed transmission of claim 4, wherein one of said torque-transmitting mechanisms selectively interconnects said first member of said fourth planetary gear set with said stationary member and another of said torque-transmitting mechanisms selectively interconnecting said second member of said fourth planetary gear set with said stationary member.

6. The multi-speed transmission of claim 1, wherein two of said six torque-transmitting mechanisms each selectively interconnect a respective member of one of said planetary gear sets with said stationary member;

wherein a first of said two torque-transmitting mechanisms is engaged only during selected ones of said seven forward speed ratios; and wherein a second of said two torque-transmitting mechanisms are engaged only during said three reverse speed ratios.

7. The multi-speed transmission of claim 1, wherein a first of said six torque-transmitting mechanisms is operable for selectively interconnecting said third member of said first planetary gear set with one of said third member of said fourth planetary gear set and said stationary member.

8. The multi-speed transmission of claim 1, wherein a second of said six torque-transmitting mechanisms is operable for selectively interconnecting said first member of said first planetary gear set and said first member of said second planetary gear set with said third member of said fourth planetary gear set.

9. The multi-speed transmission of claim 1, wherein a third of said six torque-transmitting mechanisms is operable for selectively interconnecting said third member of said second planetary gear set with said third member of said fourth planetary gear set.

10. The multi-speed transmission of claim 1, wherein a fourth of said six torque-transmitting mechanism is operable for selectively interconnecting said third member of said second planetary gear set with said first member of said third planetary gear set.

11. The multi-speed transmission of claim 1, wherein a fifth of said six torque-transmitting mechanisms is operable for selectively interconnecting said first member of said fourth planetary gear set with said stationary member.

12. The multi-speed transmission of claim 1, wherein a sixth of said six torque-transmitting mechanisms is operable for selectively interconnecting said second member of said fourth planetary gear set with said stationary member.

13. The multi-speed transmission of claim 1, further comprising:
a fourth interconnecting member continuously interconnecting said second member of said first planetary gear set with said third member of said fourth planetary gear set; and
a seventh torque-transmitting mechanism operable for selectively interconnecting said fourth interconnecting member and, therefore, said second member of said first planetary gear set and said third member of said fourth planetary gear set, with said stationary member.

14. The multi-speed transmission of claim 1, wherein forward ratio shifts are of the single transition type.

15. The multi-speed transmission of claim 1, wherein two of said six torque-transmitting mechanisms are stationary type clutches and four of said six torque-transmitting mechanisms are rotating-type clutches.

16. The multi-speed transmission of claim 1, wherein three of said six torque-transmitting mechanisms are stationary-type clutches and three of said six torque-transmitting mechanisms are rotating-type clutches.

17. A multi-speed transmission comprising:
an input shaft;
an output shaft;
first, second, third and fourth planetary gear sets each having a first, a second and a third member, said members including a sun gear member, a ring gear member and a planet carrier assembly member;
said first member of said first planetary gear set being continuously connected with said first member of said second planetary gear set;

said first member of said third planetary gear set being continuously interconnected with said first member of said fourth planetary gear set;

said second member of said third planetary gear set being continuously interconnected with said second member of said fourth planetary gear set;

said second member of said second planetary gear set being continuously connected with said a stationary member;

said input shaft being continuously connected with said third member of said second planetary gear set and said output shaft being continuously connected with said third member of said third planetary gear set;

a first torque-transmitting mechanism operable for selectively interconnecting said third member of said first planetary gear set with one of said third member of said fourth planetary gear set and said stationary member;

a second torque-transmitting mechanism operable for selectively interconnecting said first member of said first planetary gear set and said first member of said second planetary gear set with said third member of said fourth planetary gear set;

a third torque-transmitting mechanism operable for selectively interconnecting said third member of said second planetary gear set with said third member of said fourth planetary gear set;

a fourth torque-transmitting mechanism operable for selectively interconnecting said third member of said second planetary gear set with said first member of said third planetary gear set;

a fifth torque-transmitting mechanism operable for selectively interconnecting said first member of said fourth planetary gear set with said stationary member; and a sixth torque-transmitting mechanism operable for selectively interconnecting said second member of said fourth planetary gear set with said stationary member;

said six torque-transmitting mechanisms being operable in combinations of two to provide at least seven forward speed ratios and three reverse speed ratios; wherein any of said members of said planetary gear sets rotating during said seven forward speed ratios rotate in one direction.

18. The multi-speed transmission of claim 17, wherein said fifth torque-transmitting mechanism is engaged only during said three reverse speed ratios and said sixth torque-transmitting mechanism is engaged only during selected ones of said seven forward speed ratios.

19. The multi-speed transmissions of claim 17, wherein a first, a second and a third of said seven forward speed ratios are substantially equivalent in value with respective ones of said three reverse speed ratios such that shifting may occur from said first, second and third forward speed ratios to said respective substantially equivalent reverse speed ratios.

20. A multi-speed transmission comprising:
an input shaft;
an output shaft;
first, second, third and fourth planetary gear sets, each of said planetary gear sets having a first, a second and a third member, said members including a sun gear member, a planet carrier assembly member and a ring gear member;
six torque-transmitting mechanisms;
said input shaft being continuously connected with said second planetary gear set and being selectively connectable with said third and fourth planetary gear sets via two of said six torque-transmitting mechanisms, respectively;

another one of said six torque-transmitting mechanisms being operable for selectively connecting said second planetary gear set with said fourth planetary gear set;

another two of said six torque-transmitting mechanisms being operable for selectively connecting a different respective member of said fourth planetary gear set with said stationary member;

a final one of said six torque-transmitting mechanisms being operable for selectively connecting said first planetary gear set with one of said fourth planetary gear set and said stationary member;

said output shaft being continuously connected with a member of said third planetary gear set; and said six torque-transmitting mechanisms being engaged in combinations of two to establish seven forward speed ratios and three reverse speed ratios between said input shaft and said output shaft.

* * * * *